United States Patent

Iwasaki et al.

[11] Patent Number: 5,877,783
[45] Date of Patent: *Mar. 2, 1999

[54] RECORDING APPARATUS HAVING IMAGE READING FUNCTION

[75] Inventors: Takeshi Iwasaki, Yokohama; Soichi Hiramatsu, Hachioji; Hideki Yamaguchi; Hiroyuki Inoue, both of Yokohama; Takashi Nojima, Mitaka; Hitoshi Nakamura, Yokohama; Akira Kida, Yokohama; Hideaki Kawakami, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 602,458

[22] Filed: Feb. 16, 1996

[30] Foreign Application Priority Data

Feb. 21, 1995 [JP] Japan ................................... 7-032350

[51] Int. Cl.⁶ .............................. H04N 1/034; B41J 2/01
[52] U.S. Cl. ...................................................... 347/3
[58] Field of Search .................................. 347/3; 358/296

[56] References Cited

U.S. PATENT DOCUMENTS

| | | | |
|---|---|---|---|
| 3,780,377 | 12/1973 | Osgood | 360/60 |
| 4,789,903 | 12/1988 | Kamada et al. | 358/296 |
| 4,839,741 | 6/1989 | Wilson | 358/404 |
| 5,124,800 | 6/1992 | Hashimoto | 358/296 |
| 5,359,425 | 10/1994 | Maehara et al. | 358/300 |
| 5,592,262 | 1/1997 | Tanaka et al. | 347/3 |
| 5,767,988 | 6/1998 | Dobbs et al. | 347/3 |
| 5,812,172 | 9/1998 | Yamada | 358/296 |

FOREIGN PATENT DOCUMENTS

| | | |
|---|---|---|
| 0 374 762 | 6/1990 | European Pat. Off. . |
| 0 605 121 | 7/1994 | European Pat. Off. . |
| 59-99862 | 6/1984 | Japan . |
| 1020832 | 4/1989 | Japan . |
| 1-273061 | 10/1989 | Japan . |
| 2-108547 | 4/1990 | Japan . |
| 2021711 | 5/1990 | Japan . |
| 2021712 | 5/1990 | Japan . |
| 2 152 326 | 7/1985 | United Kingdom . |

*Primary Examiner*—Stuart N. Hecker
*Attorney, Agent, or Firm*—Fitzpatrick, Cella, Harper & Scinto

[57] ABSTRACT

A recording apparatus having an image reading operation capable of performing image reading by an image reading device for converting image information into electrical signals, and an image recording operation by a recording device for forming an image onto a recording medium is disclosed. The recording apparatus comprises a mounting unit capable of mounting both the image reading device and the recording device, a sensor for sensing which one of the image reading device and the recording device is mounted on the mounting unit, a quality preserving section for preserving the image quality in the recording operation, and a controller for controlling the reading operation by the image reading device, the recording operation by the recording device, and the quality preserving operations. The controller disenables the quality preserving operations by the quality preserving section, when the result sensed by the sensor indicates that the image reading device is mounted on the mounting unit.

28 Claims, 5 Drawing Sheets

RECORDING APPARATUS HAVING IMAGE READING FUNCTION

BACKGROUND OF THE INVENTION

1. Field of the Invention

The present invention relates to a recording apparatus for forming the information such as characters or images onto the recording medium, and more particularly to a recording apparatus which can mount an image reading device for reading the character or image information and converting it into electrical signal.

2. Related Background Art

Recording apparatuses are provided with recording means having a plurality of recording elements for forming the character or image onto a recording medium such as a paper, a cloth or a plastic sheet, based on the character or image information, to perform the recording operation by driving the recording means under the control of control means. These recording apparatuses can be classified into an ink jet system, a wire dot system, a thermal system, and a laser beam system, in accordance with the recording system of recording means used.

Among these recording apparatuses, a serial-type recording apparatus which takes the recording system of scanning in a direction orthogonal to the conveying direction of recording medium (sub-scan direction) can accomplish the image recording over the entire area of recording medium by repeating such an operation that after setting the recording medium at a predetermined recording position, the image recording (main scanning) of one line is conducted by recording means (recording head) mounted on a carriage which moves along the surface of recording medium, after completion of recording one line, the paper feed by a predetermined amount (sub-scanning) is conducted, and then the image recording of the next line (main scanning) is performed.

On the other hand, a line-type recording apparatus which performs the recording only by the sub-scanning of feeding the recording medium in the conveying direction can perform the image recording over the entire area of recording medium by repeating the operation of, after setting the recording medium at a predetermined recording position, recording one line collectively, feeding (in pitches) the medium by a predetermined amount, and then recording the next line collectively.

There are various types of recording apparatuses as above described, but among others, a recording apparatus of the ink jet type (an ink jet recording apparatus), i.e., one performing the recording by discharging the ink from recording means (recording head) onto the recording medium, has been presented in various application forms in recent years, owing to its favorable advantages including (1) easy construction of more compact recording means, (2) recordability of higher definition image at higher speed, (3) usability of plain paper for recording without needs of any special treatment, (4) lower running cost, (5) less noise owing to the non-impact method, and (6) easy recording of color image by using multi-color inks.

In particular, an apparatus having recording means (recording head) of the ink jet system of discharging the ink by the use of heat energy can be easily fabricated with an arrangement of liquid channels (discharge ports) at high density by forming electrothermal converters, electrodes, liquid channel walls, and a ceiling plate as the film on a substrate through a semiconductor fabrication process including etching, vapor deposition and sputtering, and thus has found wide application due to its advantage that more compact construction can be attained.

The above ink jet recording apparatus, which typically uses a recording head with an arrangement of fine discharge ports, performs the quality preserving operations as described below for the recording head in order to recover or maintain it in the state capable of forming the excellent image, in the cases where there is sticking ink droplet or foreign matter around discharge ports, or entrained air bubble or dust into any discharge ports, or the ink becomes unsuitable for discharging or recording due to thickening or fixing of ink caused by the evaporation of ink solvent.

For example, when the power of recording apparatus is turned off, or the recording apparatus will not be used over a long period of time, an operation of enclosing the recording head face with a cap made of highly sealable material such as rubber (capping operation) is performed to prevent evaporation of the ink solvent from the discharge ports.

Furthermore, immediately after the initialization by turning on the power of recording apparatus main body, directly before starting the recording onto the recording medium set at a predetermined recording position, or directly before starting the next recording after discharging the ink by a predetermined amount of ink or more, an operation of wiping the surface of recording head beforehand with a wiping member to remove the foreign matter or ink adhering around the discharge ports (wiping operation) is performed.

Furthermore, when less excellent image is obtained despite the capping operation or wiping operation as above, for example, when the air bubble or dust is mixed into any discharge ports, or the ink within discharge ports is thickened or fixed therearound since the recording head has been left away without conducting the capping operation, due to some cause, an operation of compulsorily sucking the ink from the discharge ports by applying a negative pressure onto the head surface via a pump connected to a cap after performing the above capping operation (suction recovery operation) is performed.

Besides, although this operation is not directly applied on the recording head, if the capping operation is made in the state where an amount of ink remains within the cap, e.g., immediately after the suction recovery operation, the ink may be flowed back into the discharge ports to possibly cause damage to the recording head, and to prevent such damage, an operation of compulsorily sucking the ink from inside the cap before performing the capping operation (idle suction operation) may be conducted as one of the quality preserving operations.

By the way, by combining various technologies for the smaller or more composite construction of the recording apparatus as above described, numerous products capable of fulfilling multifunctions with one apparatus have been developed in recent years. Among others, many recording apparatuses have been proposed which can take in the image information by miniaturizing an image reading device (scanner) of sensing the image information with a photosensor and converting it into electrical signal, and shaping that device to be mountable on, for example, a carriage on which the recording head has been mounted (Japanese Patent Publication No. 1-20832, Japanese Patent Publication No. 2-21711, Japanese Patent Publication No. 2-21712). These recording apparatuses having the image reading function are not an ink jet recording apparatus, but the ink jet recording apparatuses capable of mounting such a scanner include conceivably the serial type in which the carriage mounting the recording head is also employed as scanner mounting means, and the line type in which a line head for recording one line onto the recording medium collectively and the carriage which mounts a scanner are separately provided.

However, the conventional scanner mountable recording apparatus has the following problems.

Figure 8:
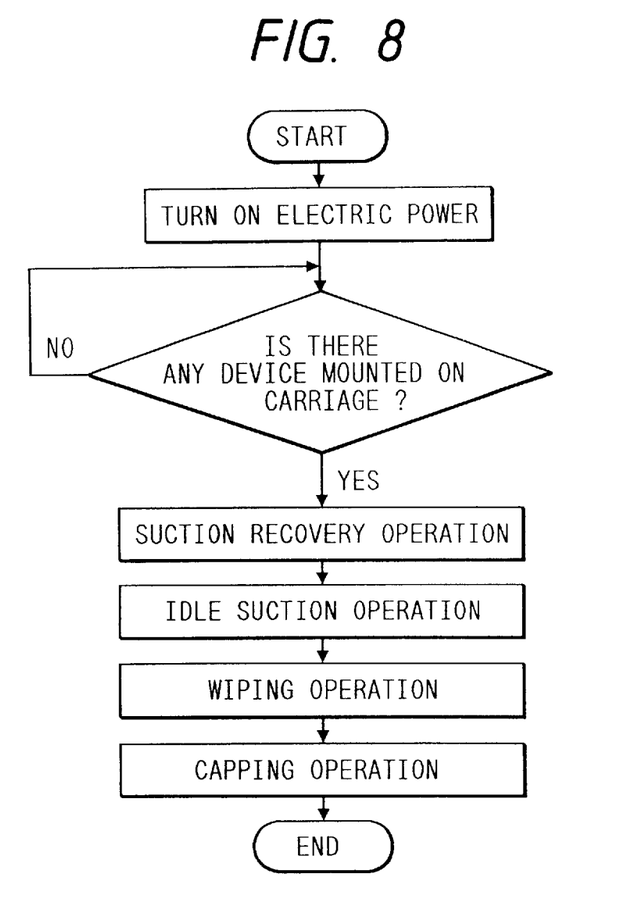
FIG. 8 is a flowchart showing the initialize operation in a conventional scanner mountable ink jet recording apparatus of the serial type.

In the recording apparatus capable of mounting the scanner, a variety of quality preserving operations as above described may also be performed during the course of reading the image by scanner. One example is an initialization routine, as shown in FIG. 8, in the ink jet recording apparatus of the serial type capable of mounting the scanner, in which when the power is turned on, all of the suction recovery operation, idle suction operation, wiping operation, and capping operation are automatically carried out, whether the recording head or scanner is mounted on the carriage. In this way, the conventional scanner mountable recording apparatus has a problem that, because the reading operation by scanner causes unnecessary quality preserving operations to be performed, an excess amount of time may be taken in reading. Furthermore, the serial-type recording apparatus as previously mentioned may have possibly a significant trouble that the ink adhering to the cap or wiping member is scattered over the surface of scanner upon the capping or wiping operation, because the scanner is mounted on the same carriage as the recording head, thereby causing an abnormal reading operation.

SUMMARY OF THE INVENTION

An object of the present invention is to provide a recording apparatus having an image reading function which, when an image reading device (scanner) is mounted on a carriage, can provide control of disenabling unnecessary quality preserving operations, thereby taking no excess amount of time in reading.

It is another object of the present invention to provide a recording apparatus having an image reading function comprising mounting means capable of mounting both image reading means for converting the image information into electrical signal, and recording means for forming an image onto a recording medium, sensing means for sensing which one of said image reading means and said recording means is mounted on said mounting means, quality preserving means for preserving the image quality in recording operation, and control means for controlling the reading operation by said image reading means, the recording operation by said recording means, and the quality preserving operations by said quality preserving means, wherein said control means disenables the quality preserving operations by said quality preserving means, when the result sensed by said sensing means indicates that said image reading means is mounted on said mounting means.

It is a further object of the present invention to provide a recording apparatus having an image reading function in which control is made by control means such that only when recording means is mounted on mounting means, the quality preserving operations by recovery means are performed on said recording means, while when image recording means is mounted on said mounting means, the quality preserving operations are disenabled, whereby it takes no excess amount of time by performing unnecessary quality preserving operations in reading the image, and it is possible to prevent scattering of the ink over the image reading means.

DETAILED DESCRIPTION OF THE PREFERRED EMBODIMENTS

The present invention will be now described by way of example with reference to the drawings. First, the outline of an ink jet recording apparatus as exemplifying the recording apparatus according to the present invention will be explained.

Figure 2:
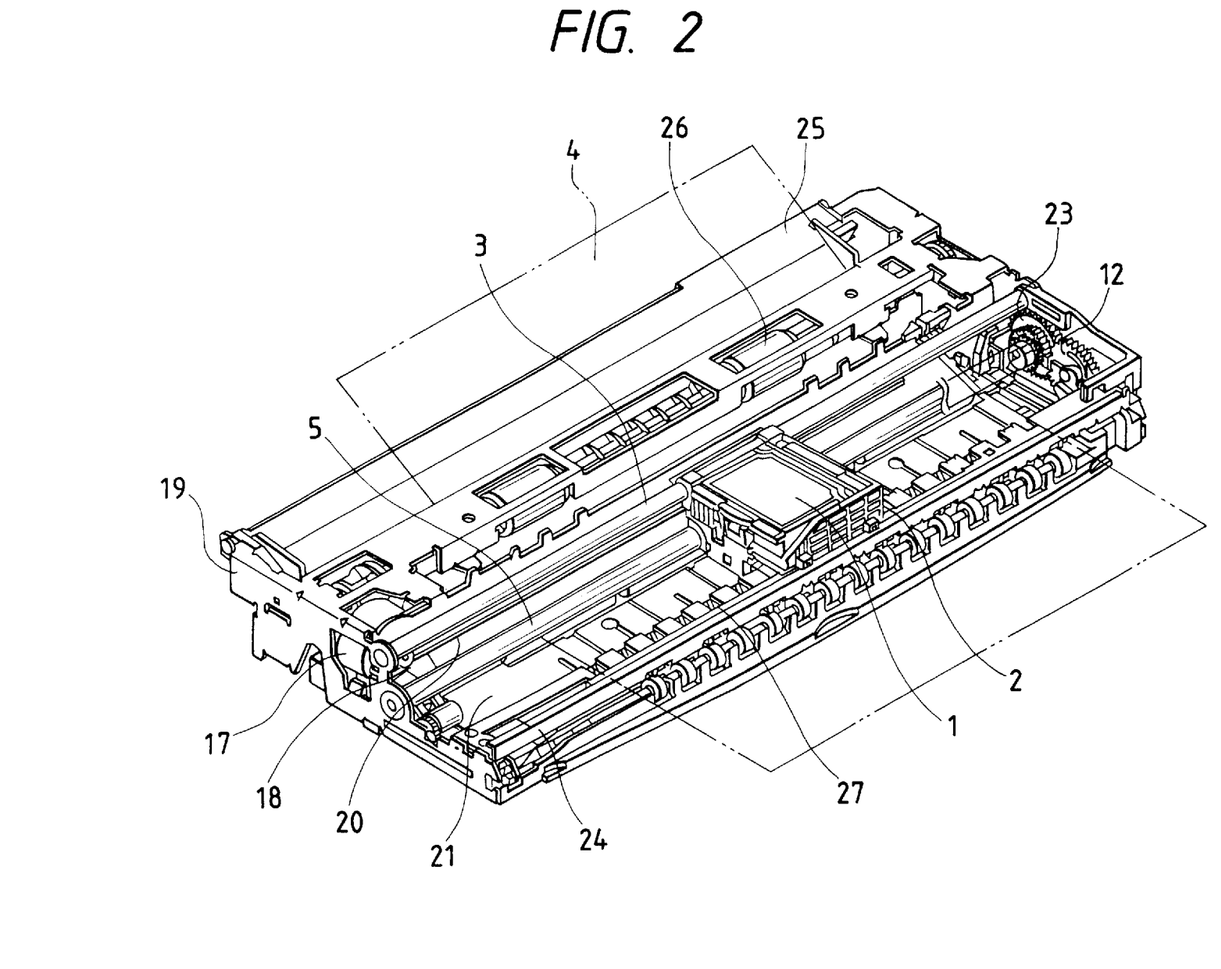
FIG. 2 is a schematic constitutional view of a recording unit in an ink jet recording apparatus.
Figure 3:
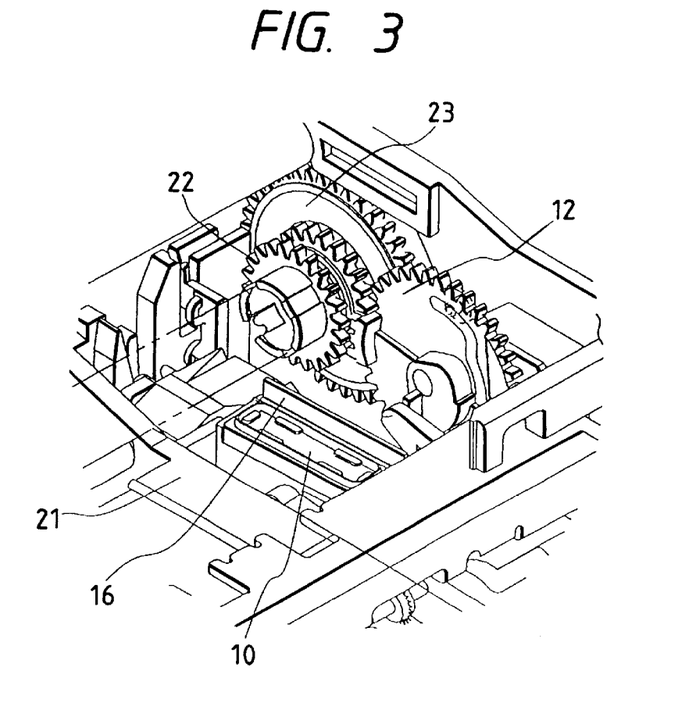
FIG. 3 is an enlarged view of a gear portion of the ink jet recording apparatus as shown in FIG. 2.

FIG. 2 is a schematic constitutional view of a recording unit in the ink jet recording apparatus, and FIG. 3 is an enlarged view of a gear portion in the ink jet recording apparatus as shown in FIG. 2.

In FIGS. 2 and 3, the ink jet recording apparatus comprises a pick-up roller 26, a feed roller 5 and a pinch roller 27 for feeding a recording medium 4, a recording head 1 which is means for recording on the recording medium 4, a carriage 2 on which the recording head 1 is mounted, a guide shaft 3 and a guide rail 24 for slidably supporting the carriage 2 in a direction orthogonal to the conveying direction of the recording medium 4 and a direction parallel to its plane, a carriage driving belt 20 for reciprocating the carriage 2 linearly, a carriage driving motor 17 and a driving pulley 18, a pressure plate 25 and a base 21.

The recording head 1 is constructed to be integral with or separable from an ink tank. This recording head 1 may be a replaceable ink jet recording head, having electromechanical converters such as piezoelectric elements to discharge the ink from the discharge ports using the shape variations of electromechanical converters, or having electrothermal converters such as heaters for discharging the ink in such a way as to apply a predetermined voltage thereto to produce heat energy and cause growth and shrinkage of bubbles by film boiling to make use of pressure changes. At a predefined movement position of this recording head 1, there are provided a wiper 16 which is a wiping member of recording head 1 and a cap 10 which is a capping member.

The pinch roller 27 is pressed against the feed roller, biased by a spring (not shown), to convey the recording medium 4. At one end of the feed roller 5, a trigger gear 22 and an LF gear 23 are axially supported, and connected to a conveying motor (not shown). Further, a pump gear 12 is provided to transmit a motive force from this LF gear 23 to a recovery device, not shown, via the trigger gear 22.

The recording operation onto the recording medium 4 in the above ink jet recording apparatus will be described below.

Before the recording, the recording medium 4 is placed on the pressure plate 25. Then, the pickup roller 26 is separated from the pressure plate 25 owing to a release cam (not shown) provided at the shaft around which the pickup roller 26 is attached.

If the recording medium 4 is set and the driving of the feed roller 5 is transmitted via the gear (not shown) to the pickup roller 26 and the release cam, the release cam is separated from the pressure plate 25, so that the pressure plate 25 rises to bring the pickup roller 26 into contact with the recording medium 4. Then, with the rotation of the pickup roller 26, the recording medium 4 is conveyed to a position opposed to an ink discharge face of the recording head 1.

If the recording medium 4 has been conveyed up to a predefined recording position, the carriage driving motor is driven to rotate the carriage driving belt 20. Thereby, the carriage 2 is reciprocated linearly along the carriage guide shaft 3 and the guide rail 24. And the ink is discharged in response to an image signal from the recording head 1 mounted on the carriage 2, so that the image (including characters) is recorded on the recording medium 4 in accordance with that image signal.

In the cases where the foreign matter such as paper dust or dirt is attached to the ink discharge portion of the recording head 1, or the ink in the discharge portion is dried and thickened or fixed, the clogging may occur in some discharge ports to cause a discharge failure (including non-discharge). To prevent such discharge failure by this clogging, the following processing with the recovery device (not shown) is performed. While the recording is not performed, the ink discharge ports of the recording head 1 are enclosed with the cap 10 (capping operation), and the thickened ink is sucked from the discharge ports via the cap 10, using suction means such as a pump (not shown), as required (suction recovery operation). Thereby, the discharge ports can be always maintained in the normal condition. Note that the capping operation occurs by moving the recording head 1 to a capping position provided outside the recording area, with the cap 10 in direct contact with the ink discharge portion at that capping position.

The driving force to attain the contacting operation of the cap 10 is transmitted from a motor (not shown) via the LF gear 23 and the pump gear 12. However, since the LF gear 23 and the pump gear 12 are out of engagement at normal time, the trigger gear 22 is pushed in by the carriage 2 at the capping time, to permit the LF gear 23 and the trigger gear 22 to be contacted. As the trigger gear 22 is contacted with the LF gear 23, the driving can be transmitted via the trigger gear 22 to the pump gear 12 (the trigger gear 22 and the pump gear 12 are operated in conformance with a certain shape, not shown). In this way, the switch of driving can be effected by pushing in the carriage 2.

Also, if the ink is adhered around the ink discharge ports of the recording head 1, the direction of discharging the ink may be disturbed, or the ink discharging as such may become difficult. In such a case, an operation of wiping the discharge face of recording head 1 with a wiper 16 by moving the carriage 2 toward the wiper 16 (wiping operation) is performed.

In addition to this, if the capping operation is conducted while an amount of ink remains within the cap 10, immediately after the suction recovery operation, for example, the ink may flow back into the discharge ports of recording head 1 to cause damage to the recording head 1. In such a case, an operation of compulsorily sucking the ink from inside the cap 10 before the capping operation (idle suction operation) is performed.

While in the ink jet recording apparatus as above described, the recording head 1 is mounted on the carriage 2, it will be appreciated that the scanner may be mounted on this carriage 2. A carriage 2 which can mount a recording head when the image is recorded or a scanner when the image is read will be described below.

Figure 4:
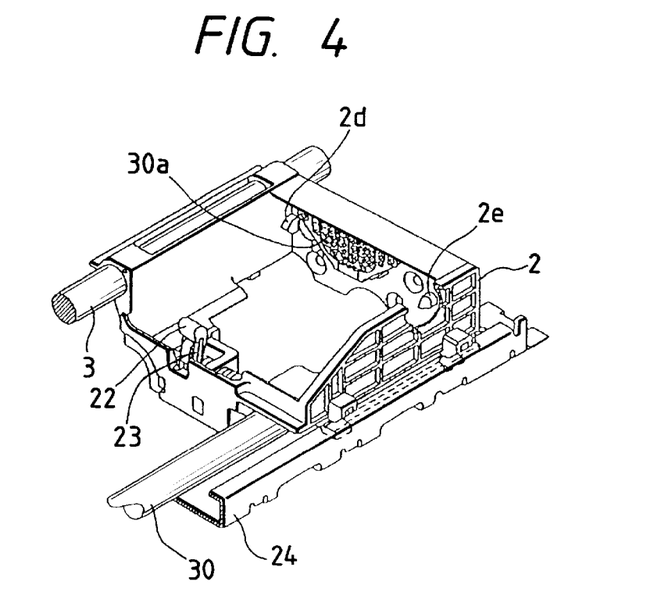
FIG. 4 is a view illustrating the main construction of a carriage 2 which can mount both a recording head and a scanner.

FIG. 4 is a view illustrating the main constitution of the carriage 2 capable of mounting both the recording head and the scanner.

At the predetermined portions of an inner wall of the carriage 2, the locating lugs 2d, 2e are formed, and on the opposite side thereof, a contact spring 23 is provided. The positioning of the recording head (or scanner) is made by these locating lugs 2d, 2e, and the recording head (or scanner) is secured by the contact spring 23. On the top end portion of this contact spring 23, a helical guide 22 is provided. Also, at a portion thereof with which the terminal of the recording head (or scanner) comes into contact, a cable terminal portion 30a is provided, and via the cable terminal portion 30a, an electrical signal is transmitted or received from a control unit (not shown) of the apparatus to the recording head (or scanner), whereby the quality preserving operations for the recording head or the scanner correction for the scanner are performed.

Figure 5:
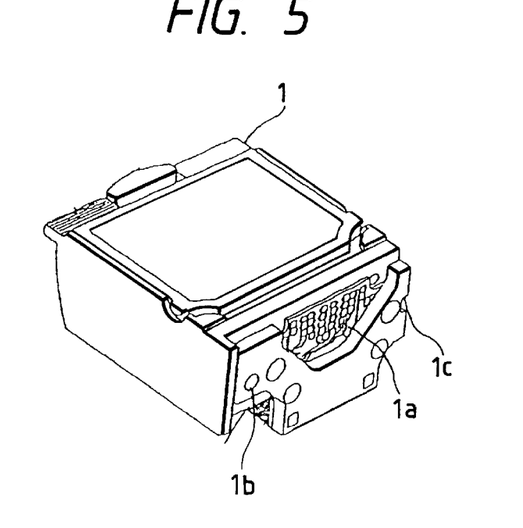
FIG. 5 is a view illustrating the state where the recording head 1 as shown in FIG. 2 is mounted on the carriage 2 as shown in FIG. 4.
Figure 6:
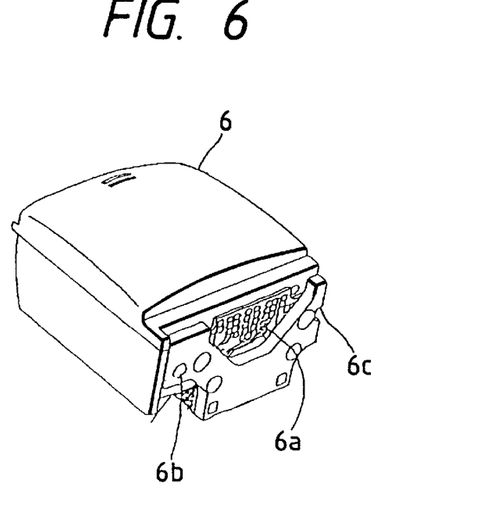
FIG. 6 is a view illustrating the state where a scanner 6 is mounted on the carriage 2 as shown in FIG. 4.

FIG. 5 shows the state where the recording head 1 as shown in FIG. 2 is mounted on the carriage, and FIG. 6 shows the state where the scanner 6 is mounted on the carriage. The recording head 1 and the scanner 6 are respectively provided with the tooling holes 1b, 6b and the positioning notches 1c, 6c, and the positioning of the recording head (or scanner) is effected by means of these tooling holes and positioning notches, and the locating lugs of the carriage 2. Also, the recording head 1 and the scanner 6 are provided with the terminal portions 1a, 6a which are electrical signal input/output contact points for transmitting or receiving the electrical signal to or from the control unit (not shown) via the cable terminal portion 30a of the carriage 2.

In securing the recording head 1 to the carriage 2, the recording head 1 is placed so that the head terminal portion 1 and the cable terminal portion 30a are opposed, and the upper face opposite the head terminal portion 1a is lowered to allow a locating lug 2d to be fitted into a head positioning notch 1c, and a locating lug 2e to be fitted into a head tooling hole 1b. Then, the recording head 1 is secured by the contact spring 23, whereby the contact between the head terminal portion 1a and the cable terminal portion 30a of the carriage 2 can be securely obtained owing to pressure of this contact spring 23.

The securing of the scanner 6 to the carriage 2 can be effected in similar manner to securing the recording head 1 as above described.

Herein, the scanner 6 is an image reading device principally comprised of a light source, a light receiving unit, an amplifier, an A/D converter, and an image processor, and can read the image (including characters) recorded on the recording medium 4 in the following way. Light is directed to the record surface of the recording medium 4 by reciprocating the carriage 2 along the recording medium 4 which has been recorded. The reflected light from the record surface of the recording medium 4 is sensed with the light receiving unit, and the intensity of reflected light is magnified by an appropriate power, quantized, and corrected, the result being output as an image data signal from the scanner terminal portion 6a to the control unit (not shown).

Next, the image recording and reading operation which is performed by the recording apparatus having the image reading function with the carriage 2 capable of mounting both the recording head and the scanner (e.g., an ink jet recording apparatus as shown in FIG. 2) will be described below.

In this recording apparatus having the image reading function, since the recording head or scanner is mounted on the carriage 2, as required, it is necessary to determine which of the recording head 1 and the scanner 6 is mounted on the carriage 2.

Figure 7:
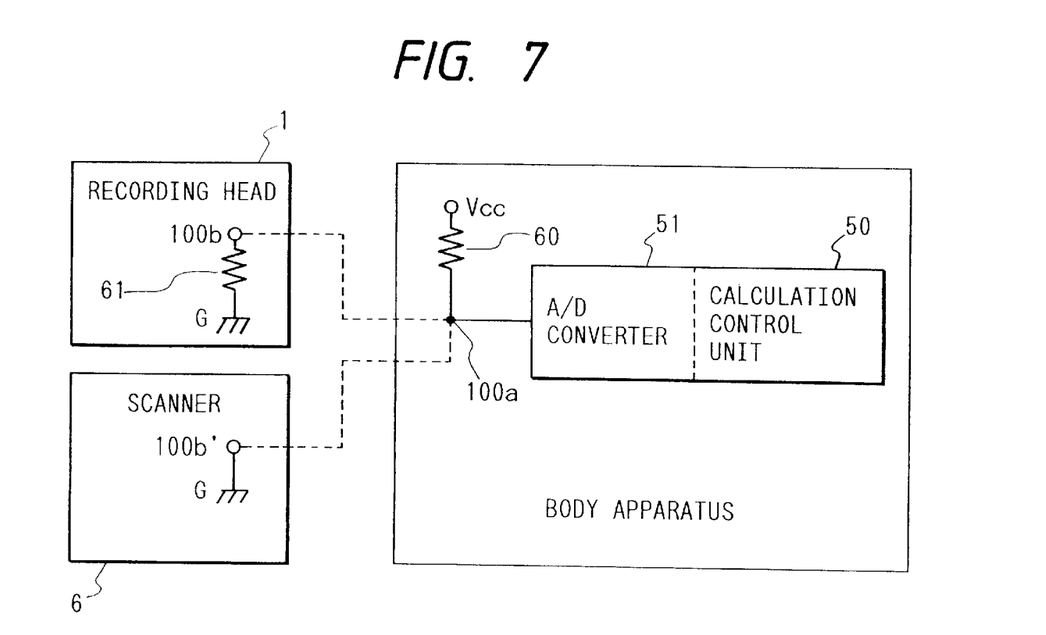
FIG. 7 is a principle diagram for explaining how to discriminate whether the recording head 1 or scanner 6 is mounted on the carriage 2.

FIG. 7 is a principle diagram for explaining how to discriminate which of the recording head 1 and the scanner 6 is mounted on the carriage 2.

The head terminal portion 1a (FIG. 5) of the recording head 1 is provided with a terminal 100b connected to a resistor 61 having one end grounded, and the scanner terminal portion 6a (FIG. 6) of the scanner 6 is provided with a terminal 100b' which is simply grounded. On the other hand, the main apparatus 100 comprises a calculation control unit 50 which receives input from the A/D converter 51, and in the terminal portion connected to the terminal portions 1a, 6a via a flexible cable 30, is provided with a terminal 100a corresponding to each terminal 100b, 100b'. This terminal 100a is connected to the A/D converter 51, to which a voltage Vcc is applied via a resistor 60.

With the sensing means constructed in the above manner, when the recording head 1 is mounted, the voltage divided value between voltage dividing resistor 60 on the main apparatus side and resistor 61 of the recording head 1 is read by the A/D converter 51 contained in the calculation control unit 50 within the main apparatus 100, whereby the mounting of recording head 1 can be determined. Also, when the scanner 6 is mounted, the read value by the A/D converter 51 is at the ground level, because the resistance corresponding to the resistor 61 in the recording head 1 is equal to zero ohm, whereby the mounting of scanner 6 can be determined.

Figure 1:
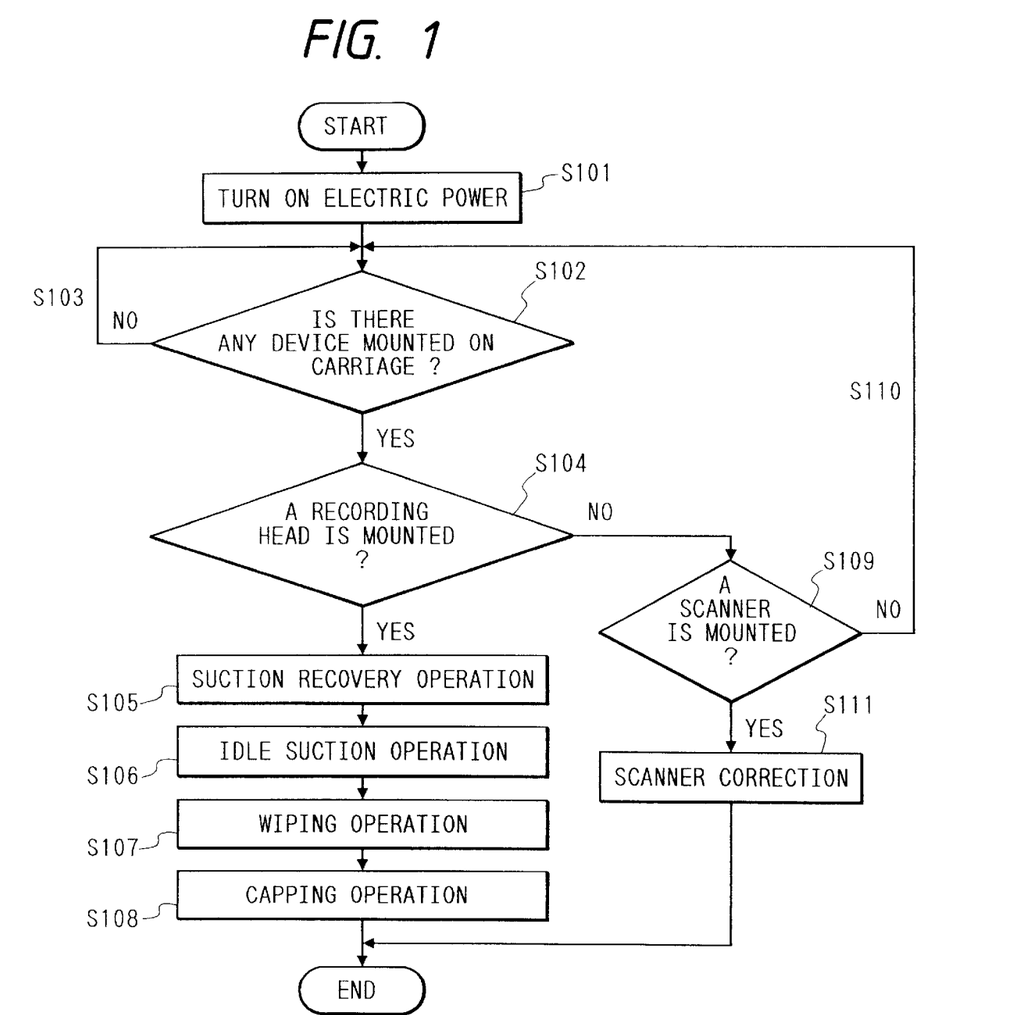
FIG. 1 is a flowchart showing the operation of a recording apparatus having an image reading function in one example of the present invention.

The operation of the recording apparatus having the image reading function in this example is shown in FIG. 1 which is a flowchart representing the initialize operation at the power-on.

If the power of the recording apparatus main body is turned on (S101), a determination is made whether or not there is any device mounted on the carriage 2 (S102). If there is no device mounted on the carriage 2, the operation returns to step S102 (S103). On the other hand, if there is any device mounted on the carriage 2, a determination is subsequently made whether or not the mounted device is a recording head 1, like the above determination, by the calculation control unit 50 of the main apparatus. If the mounted device is the recording head 1, the quality preserving operations for preserving the quality of recording operation as previously described, i.e., suction recovery operation (S105), idle suction operation (S106), wiping operation (S107), capping operation (S108), are performed successively, so that the apparatus is placed in the stand-by state, and the operation is ended. On the other hand, if the mounted device is not the recording head 1, a determination is performed whether or not the device mounted on the carriage 2 is the scanner 6 (S109). If the mounted device is not the scanner 6, the operation returns to step S102 (S110). On the other hand, if the device mounted on the carriage 2 is the scanner 6, the initial scanner correction operation necessary for reading the image (color calibration by reading the white color of a white member provided along the moving area of carriage 2 by means of the scanner 6) (S111) is performed, so that the apparatus is placed in the stand-by state, and the operation is ended.

In the recording apparatus having the image reading function of this example, when the scanner 6 is mounted as above. The reading processing by the scanner 6 can be effected without spending any excess time, because the quality preserving operations (suction recovery operation, idle suction operation, wiping operation and capping operation) unnecessary for the reading processing are not performed, and the scattering of ink over the image reading apparatus upon the wiping operation and the capping operation can be securely prevented.

While the invention has been described in detail, it should be understood that various improvements and variations may be made without departing the sprit and scope of the present invention. For example, the above example was only described in the context of the initialize operation, but it is preferable for the objects of the present invention that several operations necessary for the recording apparatus are omitted when the scanner is mounted. Specifically, it will serve the objects of the present invention to disenable the quality preserving operations such as the wiping operation to be performed when the recording head 1 is mounted, the idle suction operation to be made at the power-off, the wiping operation, and the capping operation after the recording medium is set at a predetermined recording position, if the mounting of the scanner 6 is sensed.

Also, the recording apparatus of the present invention is not necessarily the serial type as above but may be the line type, in which when the scanner 6 is mounted to perform the reading operation, the quality preserving operations are unnecessary, and disenabled under the control.

Additionally, the recording apparatus according to the present invention may be integrally or separately provided as an image output terminal of the information processing equipment such as a word processor or a computer, and further, may be used for a facsimile apparatus having the transmission and reception feature.

Having thus described this example, the following effects can be exhibited.

When the image reading means is mounted on the mounting means, there is the effect that no excess time for reading is required because the unnecessary operations for the image reading means are not performed. Furthermore, because the scattering of ink over the image reading means is prevented by disenabling the quality preserving operations for this image reading means, there is the additional effect that the reliability of apparatus is enhanced.

What is claimed is:

1. A recording apparatus having an image reading operation capable of performing image reading by image reading means for converting image information into electrical signals, and an image recording operation by recording means for forming an image on a recording medium, comprising:

mounting means capable of mounting either of said image reading means and said recording means;

detecting means for detecting that said image reading means is mounted on said mounting means;

quality preserving means for preserving image quality in the recording operation; and control means for controlling the image reading operation by said image reading means, the recording operation by said recording means, and quality preserving operations by said quality preserving means, wherein said control means does not effect the quality preserving operations by said quality preserving means, when the result sensed by said sensing means indicates that said image reading means is mounted on said mounting means.

2. A recording apparatus having the image reading operation according to claim 1, wherein the recording means is a recording head of an ink jet system for discharging ink from ink discharge ports.

3. A recording apparatus having the image reading operation according to claim 2, wherein the recording head has electrothermal converters for generating heat energy for discharging the ink.

4. A recording apparatus having the image reading operation according to claim 3, wherein the recording head discharges the ink from the ink discharge ports using film boiling produced in the ink, owing to the heat energy applied by the electrothermal converters.

5. A recording apparatus having the image reading operation according to claim 4, wherein the quality preserving operations include a wiping operation of the ink adhering onto the surface of the recording head.

6. A recording apparatus having the image reading operation according to claim 3, wherein the quality preserving operations include a wiping operation of the ink adhering onto the surface of the recording head.

7. A recording apparatus having the image reading operation according to claim 2, further comprising enclosing means for enclosing the surface of the recording head while the recording operation is not performed, wherein the quality preserving operations include enclosing the surface of said recording head by said enclosing means.

8. A recording apparatus having the image reading function according to claim 7, wherein the quality preserving operations include a wiping operation of the ink adhering onto the surface of the recording head.

9. A recording apparatus having the image reading operation according to claim 7, wherein the quality preserving operations include compulsorily sucking the ink within the enclosing means.

10. A recording apparatus having the image reading operation according to claim 6, wherein the quality preserving operations include a wiping operation of the ink adhering onto the surface of the recording head.

11. A recording apparatus having the image reading operation according to claim 2, wherein the quality preserving operations include a wiping operation of the ink adhering onto the surface of the recording head.

12. A recording apparatus having the image reading operation according to claim 2, wherein the quality preserving operations include an operation of sucking the ink compulsorily from the recording head.

13. A recording apparatus having the image reading operation according to claim 1, wherein the quality preserving operations include a wiping operation of the ink adhering onto the surface of the recording head.

14. A recording apparatus having the image reading operation according to claim 1, wherein the mounting means is a carriage reciprocatable in a direction orthogonal to the direction of conveying the recording medium.

15. A recording apparatus having the image reading operation according to claim 14, wherein the carriage mounts the recording means when the image is formed, or the image reading means when the image is read.

16. An apparatus having a head mounting member for mounting a head member, said apparatus comprising:

an electrical circuit for controlling an operation of executing recording by an ink jet recording head on a recording medium based on a predetermined signal and executing reading of an original by a reading head;

a signal generating portion for generating an electrical signal indicating that said reading head is mounted on said head mounting member; and recording quality maintaining means for maintaining a recording quality of said ink jet recording head, said recording quality maintaining means not performing an operation for maintaining the recording quality on said reading head in response to generation of the electrical signal indicating that said reading head is mounted on said head mounting member.

17. An apparatus according to claim 16, wherein the ink jet recording head has electrothermal converters for generating heat energy for discharging the ink.

18. An apparatus according to claim 17, wherein the ink jet recording head discharges the ink from ink discharge ports using film boiling produced in the ink, owing to the heat energy applied by the electrothermal converters.

19. An apparatus according to claim 18, wherein said recording quality maintaining means effects a wiping operation of the ink adhering onto the surface of the ink jet recording head.

20. An apparatus according to claim 17, wherein said recording quality maintaining means effects a wiping operation of the ink adhering onto the surface of the ink jet recording head.

21. An apparatus according to claim 16, further comprising enclosing means for enclosing the surface of the recording head while the recording operation is not performed, wherein said recording quality maintaining means effects enclosing of the surface of said ink jet recording head by said enclosing means.

22. An apparatus according to claim 21, wherein said recording quality maintaining means effects compulsory suction of the ink within the enclosing means.

23. An apparatus according to claim 22, wherein said recording quality maintaining means effects a wiping operation of the ink adhering onto the surface of the ink jet recording head.

24. An apparatus according to claim 21, wherein said recording quality maintaining means effects a wiping operation of the ink adhering onto the surface of the ink jet recording head.

25. An apparatus according to claim 16, wherein said recording quality maintaining means effects a wiping operation of the ink adhering onto the surface of the ink jet recording head.

26. An apparatus according to claim 16, wherein said recording quality maintaining means effects compulsory suction of the ink from the ink jet recording head.

27. An apparatus according to claim 16, wherein the head mounting member is a carriage reciprocatable in a direction orthogonal to a direction of conveying the recording medium.

28. An apparatus according to claim 27, wherein the carriage mounts the ink jet recording head when the image is formed, or the reading head when the image is read.

* * * * *

UNITED STATES PATENT AND TRADEMARK OFFICE
CERTIFICATE OF CORRECTION

PATENT NO. : 5,877,783
DATED : March 2, 1999
INVENTOR(S) : IWASAKI ET AL.

It is certified that error appears in the above-identified patent and that said Letters Patent is hereby corrected as shown below:

On the title page, item

[56] References Cited:

FOREIGN PATENT DOCUMENTS, "1020832" should read --1-20832--.

"2021711" should read --2-21711--.

"2021712" should read --2-21712--.

COLUMN 9:

Line 35, "claim 6," should read --claim 9,--.

Signed and Sealed this

Twelfth Day of October, 1999

Attest:

Attesting Officer

Q. TODD DICKINSON

Acting Commissioner of Patents and Trademarks